United States Patent [19]

Culpeper

[11] 4,323,258
[45] Apr. 6, 1982

[54] CONVERTIBLE COASTER HAVING RUNNERS OR WHEELS

[76] Inventor: Michael L. Culpeper, 804 Greenfield Dr., Apt. 23, Lynchburg, Va. 24501

[21] Appl. No.: 116,589

[22] Filed: Jan. 29, 1980

[51] Int. Cl.$^3$ ............................................. B62B 13/18
[52] U.S. Cl. .................................. 280/7.12; 280/1.12; 280/1.21; 280/16; 280/87.01
[58] Field of Search ............. 280/7.12, 7.14, 8, 87.01, 280/87.02, 87.04 R, 1.21, 1.12, 21 R, 16, 17, 15, 12 K, 12 KL, 12 H

[56] References Cited

U.S. PATENT DOCUMENTS

| 34,874 | 4/1862 | Brown | 280/16 |
| 1,244,169 | 10/1917 | Brigel | 280/87.04 A |
| 1,938,701 | 12/1933 | Jones et al. | 280/8 |
| 2,095,951 | 10/1937 | Andrus | 280/16 X |
| 2,175,628 | 10/1939 | Forbes | 280/21 R |
| 2,392,098 | 1/1946 | Philippar | 280/12 H |
| 3,297,334 | 1/1967 | Jenks | 280/12 K |
| 4,168,076 | 9/1979 | Johnson | 280/87.04 A |
| 4,244,593 | 1/1981 | Malone | 280/7.14 X |

Primary Examiner—Joseph F. Peters, Jr.
Assistant Examiner—Milton L. Smith

[57] ABSTRACT

An operator or gravity propelled steerable coaster vehicle has a platform upon which the operator may either sit or stand while controlling the direction and speed of the vehicle. The vehicle may be supported by wheels or runners and has brakes for engaging the wheels or the surface supporting the vehicle.

6 Claims, 6 Drawing Figures

CONVERTIBLE COASTER HAVING RUNNERS OR WHEELS

BACKGROUND OF THE INVENTION

There are many occupant or gravity propelled devices employed for recreational use such as roller skates, skate boards, sleds, skis etc. Some of these devices are also designed to be convertible from a wheeled to a ski or runner supported vehicle, or vice versa. Examples of such devices are illustrated in U.S. Pat. Nos. 4,046,392; 4,116,455 and 3,374,000. The main reason for the convertible feature of the above cited patents is to insure that the device can be used year round regardless of the weather conditions prevailing at the time.

Some of the drawbacks of the prior art devices are; their obvious design for a particular surface i.e. snow or pavement, with the converting structure being an obvious afterthought; their failure to incorporate into their design the choice of a standing or sitting position for the operator; the provision of rudimentary steering mechanisms which are crude and limited in the amount of control afforded, and also particularly suited for only one of the surfaces upon which the device is intended to travel; the use of complex braking systems for the pavement use; the total absence of any brakes for those devices intended for use on snow covered surfaces; and various other defects too numerous to mention.

SUMMARY OF THE INVENTION

An object of the present invention is the provision of a convertible recreational vehicle which is intended to operate as well on a snow covered surface as it does on dry pavement.

Another object of the instant invention is the provision of a recreational vehicle which readily converts from wheels to skis with no noticeable difference in handling characteristics.

A further object of the instant invention is the provision of a recreational vehicle which gives the operator the option of standing or sitting while guiding the vehicle.

Yet another object of the instant invention is the provision of a recreational vehicle with an improved steering system and dual brake mechanisms, which are selectively actuated for either snow or dry pavement.

Still another object of the instant invention is the provision of a recreational vehicle which avoids all of the pitfalls inherent in the prior art while accomplishing all of the objectives stated supra.

These and other objects, advantages and novel features of the present invention will become apparent from the following detailed description of the invention when considered in conjunction with the accompanying drawings.

BREIF DESCRIPTION OF THE DRAWINGS

DETAILED DESCRIPTION OF THE PREFERRED EMBODIMENT

Figure 1:
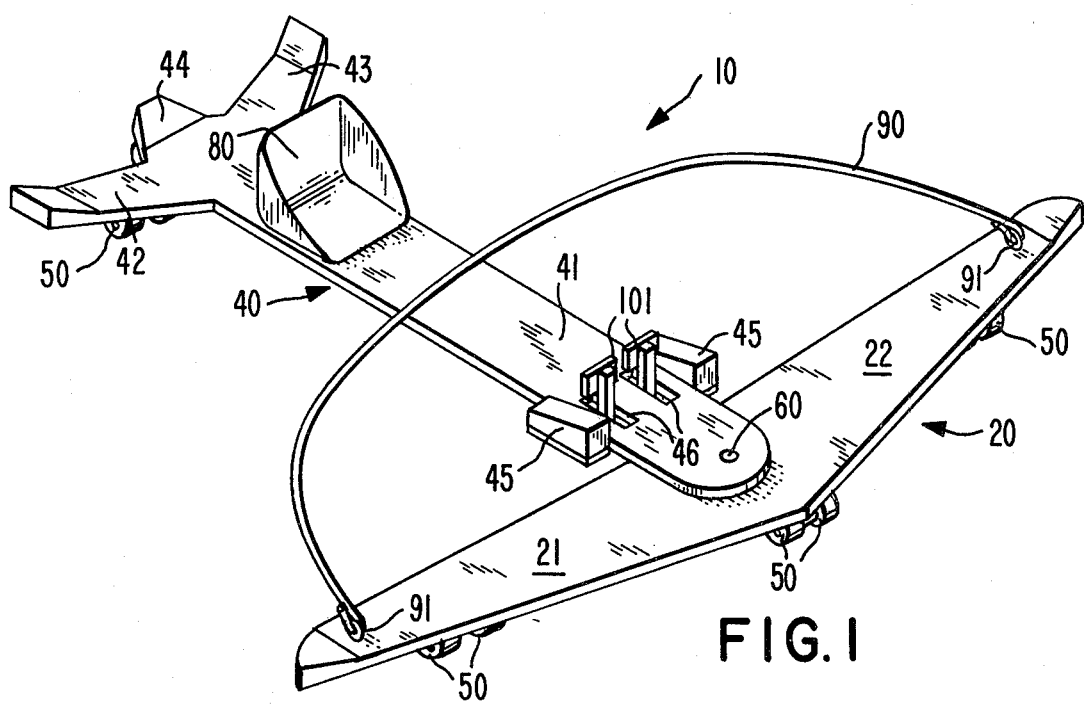
FIG. 1 is a perspective view of the wheeled version of the instant invention.
Figure 4:
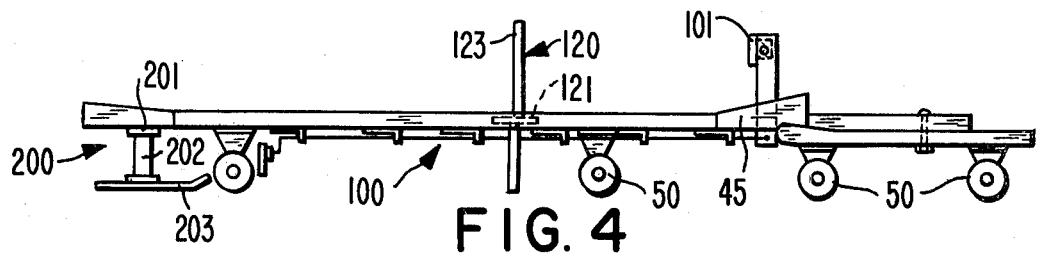
FIG. 4 is a side plan view of the ski version of the instant invention.
Figure 5:
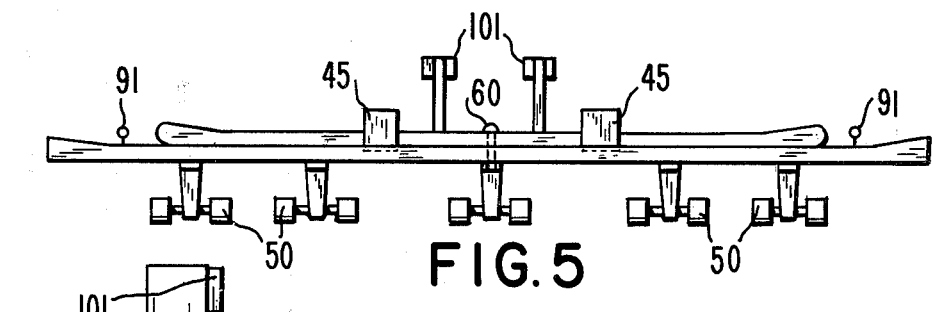
FIG. 5, is a front plan view of the wheeled version of the instant invention.
Figure 6:
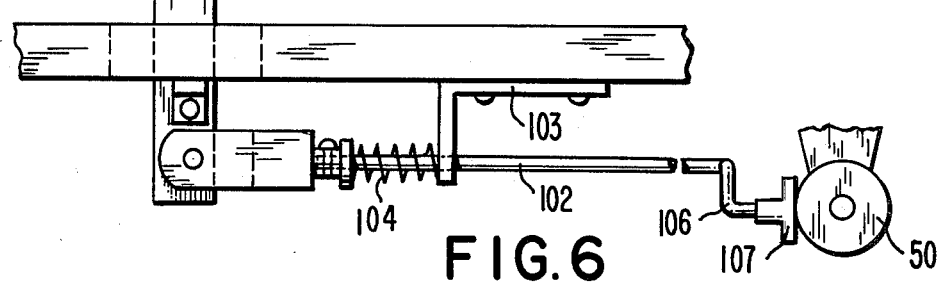
FIG. 6 is a detail view of the dual brake mechanisms of the instant invention.
Figure 2:
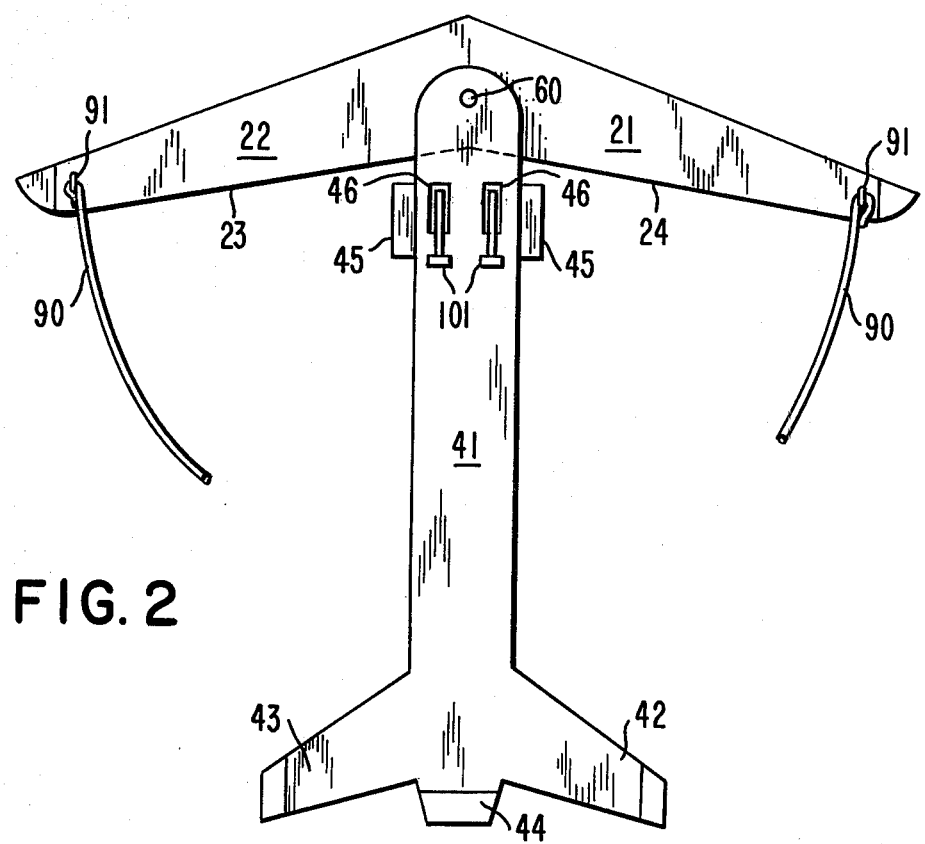
FIG. 2 is a top plan view of the recreational vehicle.
Figure 3:
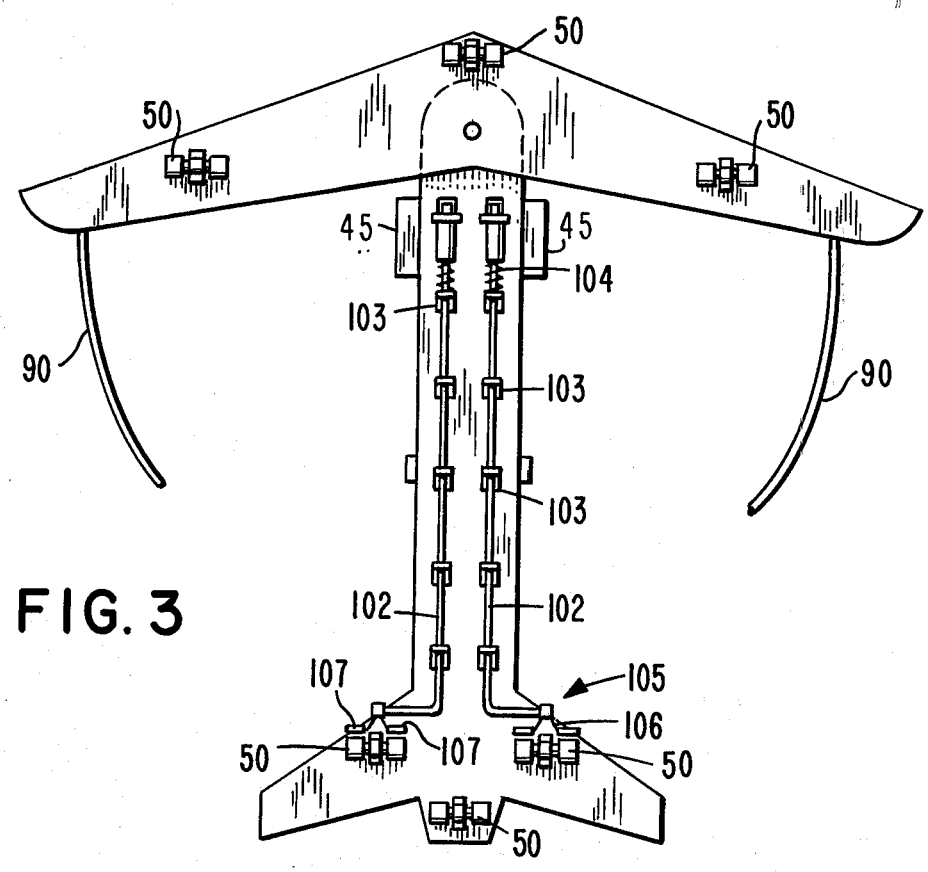
FIG. 3 is a bottom plan view of the wheeled version of the instant invention.

As can be seen by reference to FIG. 1 the recreational vehicle hereinafter referred to as the "jet racer" is designated generally as 10 and comprises a front or winged portion 20 which is attached to an elongated rear or tail portion 40 via pivot connection 60. The winged portion 20 is V-shaped in configuration and comprises a pair of elongated tapered arms 21, 22. The tail portion 40 has a modified T-shaped configuration and comprises an elongated central member 41 having opposed swept wing elements 42, 43 proximate its rearward end 44.

Positioned beneath, and removeably attached to, the front and rear portions are a plurality of wheel elements 50. The wheel elements are positioned at the mid point and proximate the ends of both arms 21, 22 of the winged portion 20. The rear portion 40 has wheel elements 50 disposed near the leading edges of the swept wing elements 42, 43, and at the mid-point and proximate the rearward end 44 of the elongated central member 41. The tail portion 40 of the jet racer is further provided with a removeable seat 80, two foot rests 45 and two elongated apertures 46 which receive a portion of one of the brake mechanisms 100.

The jet racer is provided with one set of brakes 100 for hard dry surfaces and another set of brakes 120 for snow covered surfaces. The dry surface brakes 100 comprise a pair of pivoted pedals 101 which are connected to spring biased elongated L-shaped actuating rods 102 which are slidingly received by a plurality of clamps 103 on the underside of the rear portion which allow the actuating rods to reciprocate by depressing and releasing the brake pedals against the spring elements 104. The outboard ends of the actuating rods 102 bear a brake shoe 105 comprising a U-shaped support member 106 having high friction brake pads 107 attached thereto. The brake shoes 105 are positioned in close proximity to the wheels 50 and are brought into contact with the periphery of the wheels by depression of the brake pedals 101. The snow brakes 120 comprise a pair of apertured plates 121 secured to the sides of the elongated central member 41 and projecting outwardly therefrom, wherein the apertures are dimensioned to slidingly receive an elongated brake rod 123. The rod 123 is dimensioned such that it frictionally engages the sides of the aperture, but is capable of being manually depressed into engagement with the surface or ground to brake the jet racer.

For the ski version of the jet racer the wheels 50 are replaced by ski elements 200 comprising a mounting plate 201 for removeably securing by suitable means the ski elements to the underside of the jet racer, and a shaft 202 depending downwardly therefrom which is secured to an upturned ski 203. It is understood that in the preferred embodiment the ski elements 200 occupy the same spaces which formerly held the wheels 50.

In an alternate embodiment (not shown) the ski element is designed to be removeably attached to the underside of the jet racer adjacent to, and projecting below the wheels 50. In this version the wheels 50 may be permanently affixed to the jet racer.

The preferred mode of steering the jet racer is by manually pulling on the rope or lanyard 90 which is secured to the respective ends 21, 22 of the wing portion 20 through the eyelets 91 disposed thereon. By using the lanyard 90 the rider can control the direction of travel of the jet racer from either the standing or sitting position. When the rider uses the removeable seat 80 he/she has the option of steering the jet racer manually via lanyard 90 or by exerting pressure with his/her feet on the rearward surfaces 23, 24 of the wing portion 20. When the rider is in the upright or standing position he/she is provided ample surface area for foot placement along the elongated central member 41 or on the swept wing elements 42, 43 of the tail portion 40. The winged portion 20 is pivoted at 60 about the tail portion 40, and the arc of pivotal movement in the preferred embodiment is prescribed by the location of the foot rests 45 along the elongated central member 41, wherein the foot rests 45 form of an abutment surface which limits the travel of the rearward surfaces 23, 24 of the wing portion 20. The foot rests 45 not only limit the pivotal arc of the wing portion, but further insure that the rear surfaces 23, 24 will not contact any portion of the riders body when his/her feet are positioned on or behind the rests.

Having thereby disclosed the subject matter of this invention, it should be obvious that many modifications, substitutions, and variations of the invention are possible in light of the above teachings. It is therefore to be understood that the invention may be practiced other than as specifically described, and should be limited only by the breadth and scope of the appended claims.

What I claim is:

1. A moveable pivoted platform for supporting a rider in a variety of positions comprising;
a V-shaped front portion,
a generally T-shaped rear portion, comprising an elongated central member, having two opposed foot rests disposed proximate its forward end, and two opposed swept wing elements disposed proximate its rearward end,
wherein said rear portion supports a plurality of brake mechanisms, and the said front portion is pivotally connected to said rear portion at a position forward of said footrests, so that the pivoted arc of said front portion with respect to said rear portion is determined by the location of the foot rests which form an abutment on the elongated central member, and
said platform is supported by a plurality of removable wheel elements disposed on said portions.

2. A pivoted platform as in claim 1; wherein,
said platform is provided with one brake mechanism which engages at least two of said plurality of wheel elements on said rear portion, and
a separate brake mechanism which engages a surface upon which said platform moves.

3. A pivoted platform as in claim 1; wherein,
replaceable wheel elements are disposed on said swept wing element, and at the mid-point and end of said elongated central member.

4. A pivoted platform as in claim 1; wherein,
said removeable wheel elements are interchangeable with removeable ski elements.

5. A pivoted platform as in claim 4; wherein,
said elongated central member is further provided with a removeable seat for said rider.

6. A pivoted platform as in claim 5; wherein,
said platform is steered by the manipulation of a lanyard which is attached to the outboard ends of said V-shaped front portion.

* * * * *